Figure 1:
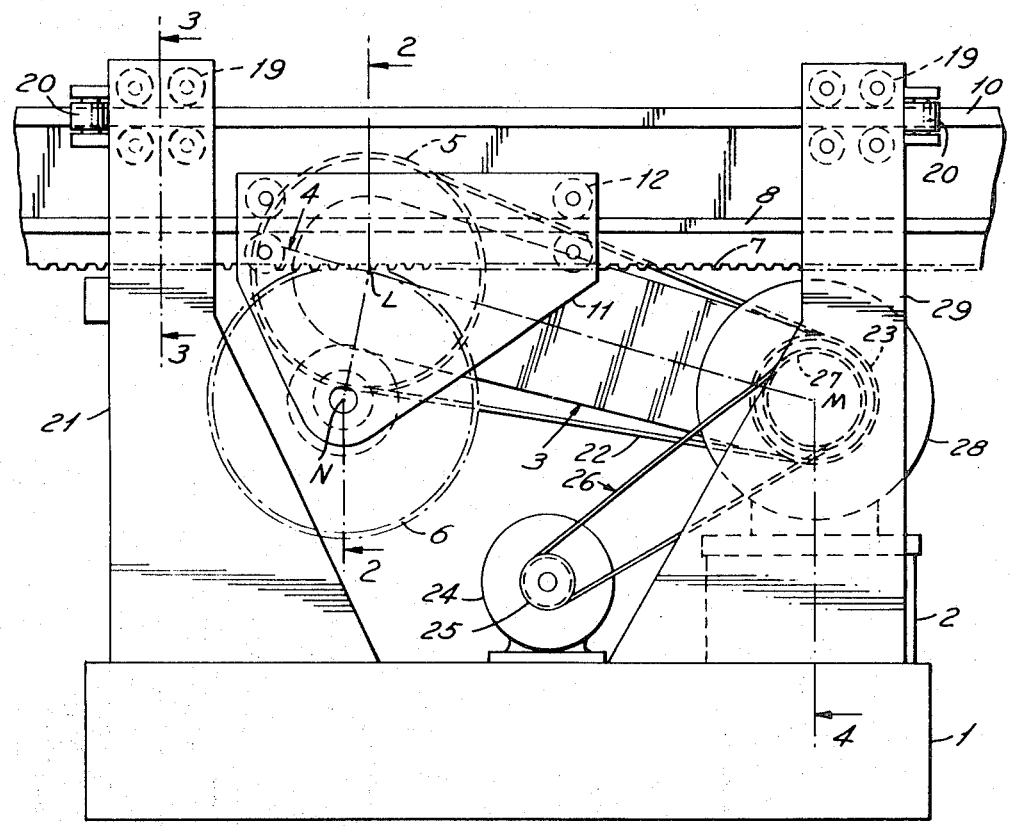

United States Patent [19]

Brems

[11] 3,789,676
[45] Feb. 5, 1974

[54] RECIPROCATING DRIVE MECHANISM
[76] Inventor: John Henry Brems, 32867 White Oaks Tr., Birmingham, Mich. 48010
[22] Filed: June 15, 1972
[21] Appl. No.: 262,957

Related U.S. Application Data
[63] Continuation-in-part of Ser. No. 80,841, Oct. 15, 1970, abandoned.

[52] U.S. Cl. .......................... 74/27, 74/29, 101/250
[51] Int. Cl. ............................................. F16h 21/02
[58] Field of Search .......... 74/27, 29, 422; 408/135; 101/250

[56] References Cited
UNITED STATES PATENTS
| | | | |
|---|---|---|---|
| 1,816,816 | 8/1931 | Barney | 74/27 |
| 1,073,104 | 9/1913 | Droitcour | 74/27 |
| 2,324,001 | 7/1943 | Kelley | 74/27 |

*Primary Examiner*—Charles J. Myhre
*Assistant Examiner*—Wesley S. Ratliff, Jr.
*Attorney, Agent, or Firm*—Arthur Raisch et al.

[57] ABSTRACT

An apparatus for transmitting rotary motion to an output motion with predetermined acceleration and velocity which includes an output member such as a lineally movable or rotary rack driven by a rotary member drivingly associated therewith, the rotary member being mounted for movement in a path generally parallel to the output member rotating about a first axis and driven by a connected rotative member mounted on a second axis spaced from the first axis to move in a path generally transverse of the direction of movement of the output member with means to control the relative positions of the output member and the rotary member to maintain the driving relationship and means to guide the rotative member in the path of movement transverse to output motion.

22 Claims, 39 Drawing Figures

AT START

AFTER 90° C.W. ROT.

AFTER 180° C.W. ROT.

AFTER 270° C.W. ROT.

AFTER 360° C.W. ROT.

Patented Feb. 5, 1974
3,789,676
10 Sheets-Sheet 4
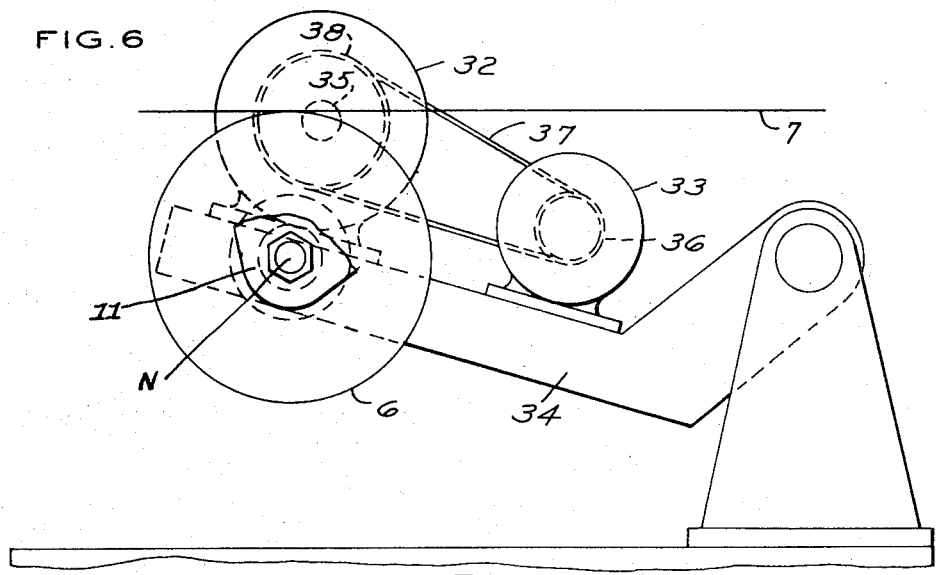
FIG.6
FIG.7
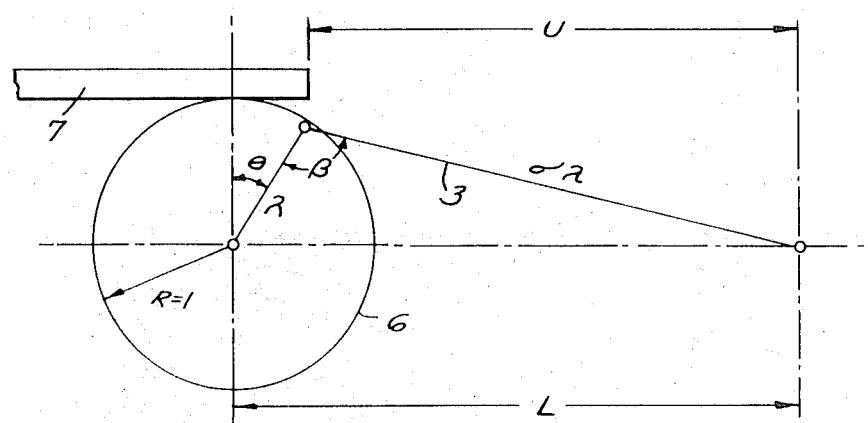
FIG.8
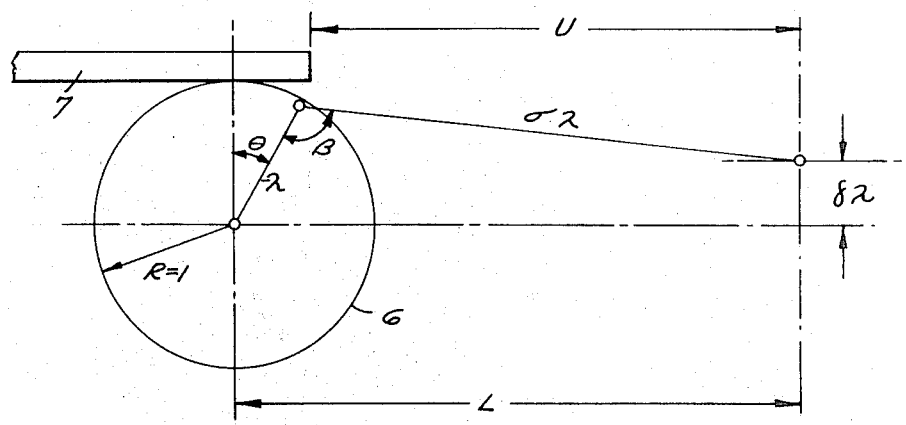

Patented Feb. 5, 1974

3,789,676

10 Sheets-Sheet 5

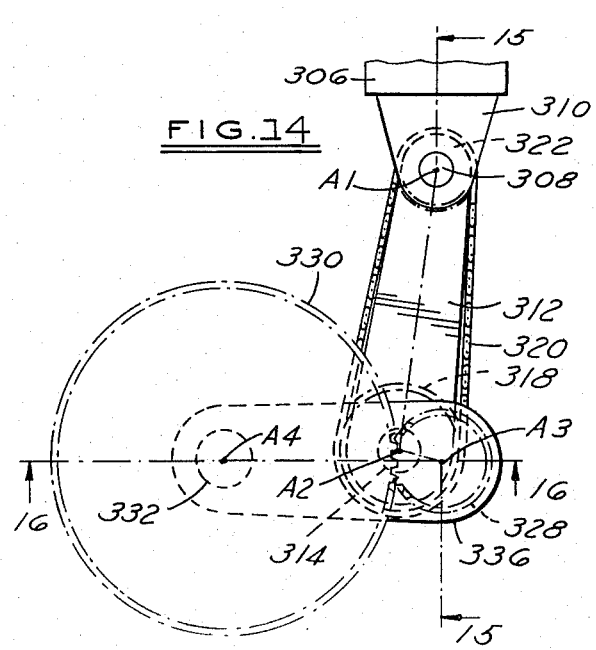
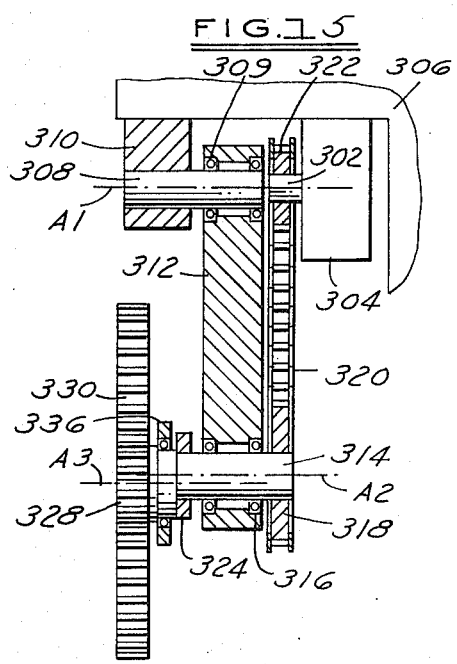
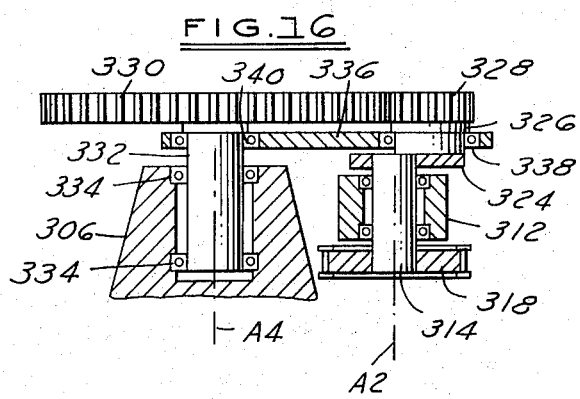
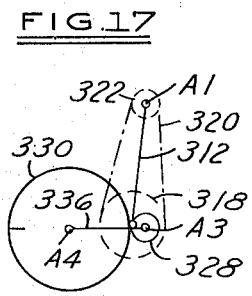
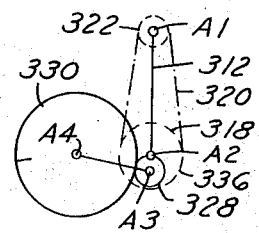
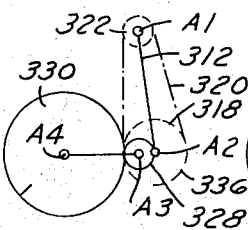
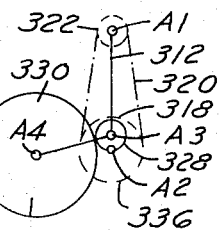
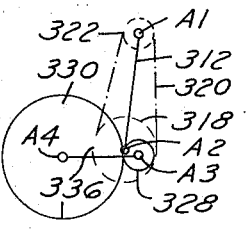

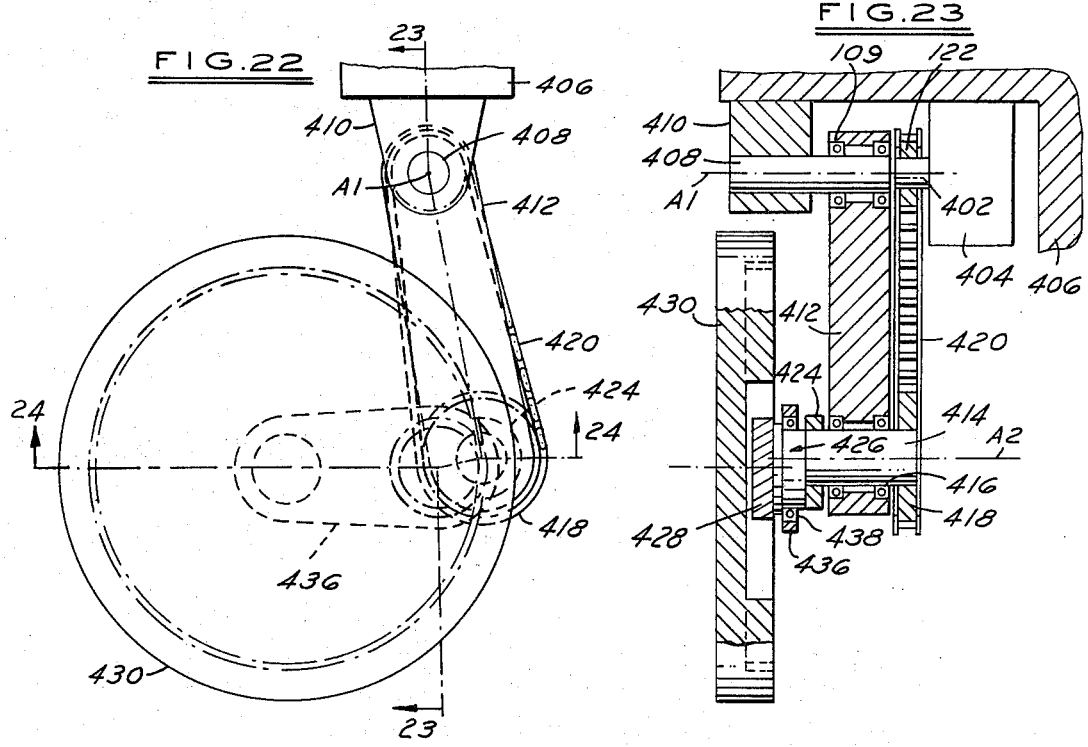
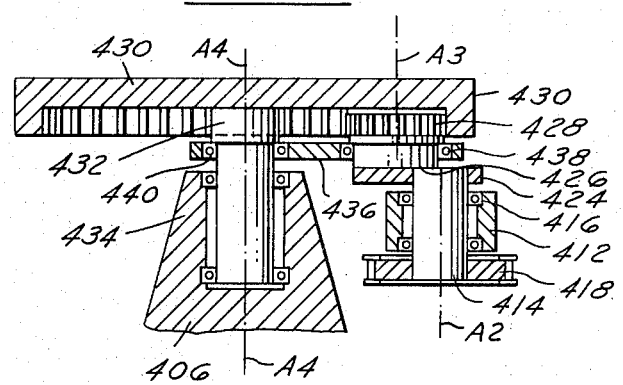

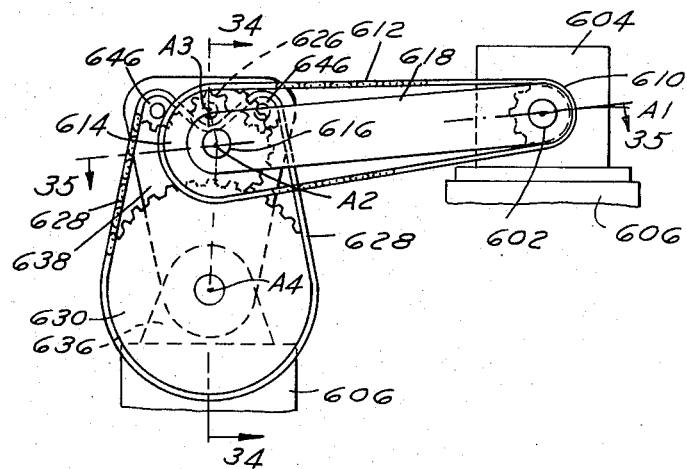
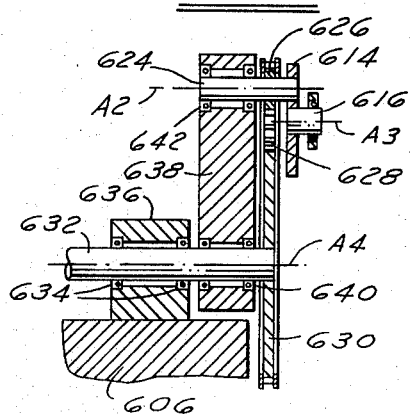
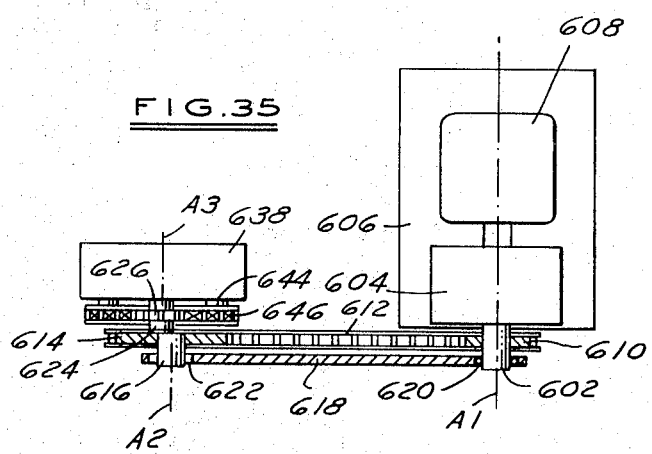

RECIPROCATING DRIVE MECHANISM

This application is a continuation-in-part of my co-pending application, Ser. No. 80,841, filed on Oct. 15, 1970, now abandoned, and entitled "Reciprocating Drive Mechanism."

This invention relates to a Reciprocating Drive Mechanism or to a multiple step indexing drive mechanism.

It is an object of this invention to provide a smooth shock-free starting and stopping action for a reciprocating or multiple indexing table which has a defined straight path of travel or defined curvilinear motion.

It is an object to provide a mechanical accelerating and declerating mechanism which is adaptable to various strokes or indexing steps depending on the particular length desired.

It is a further object to provide a mechanism in which it is possible through the judicious choice of certain geometric parameters to modify the accelerating and decelerating characteristics of the mechanism while still maintaining smoothness and freedom from shock.

It is a further object to provide a mechanism in which it is possible to vary the dwell characteristics at the end of the stroke, or between the multiple indexes, through adjustment of another geometrical parameter.

It is a further object to provide an accelerating device in which the motor or cylinder type drive system is permitted to reach its operating speed before it encounters the load of the indexing mass; similarly, the same device will decelerate the indexing mass to near zero before the motor brake is engaged or before the cylinder reaches the end of its stroke, thereby relieving these mechanisms of any great stopping loads.

Other objects and features of this invention relating to details of construction and operation will be apparent in the following description and claims in which is set forth the principles of operation and use of the invention together with the best mode presently contemplated for the practice of thereof.

Drawings accompany the disclosure and the various views thereof may be briefly described as:

FIG. 1, a side elevation of the device showing the parts in their relative positions.

Figure 2:
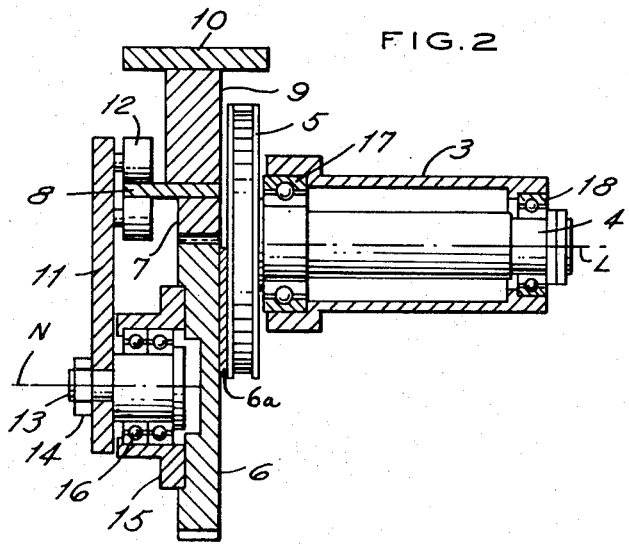

FIG. 2, a section through the device as defined by the cutting planes 2—2 shown in FIG. 1.

Figure 3:
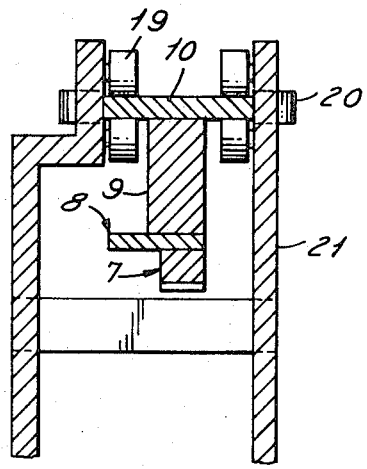

FIG. 3, a section through the devices as defined by the cutting plane 3—3 as shown in FIG. 1.

Figure 4:
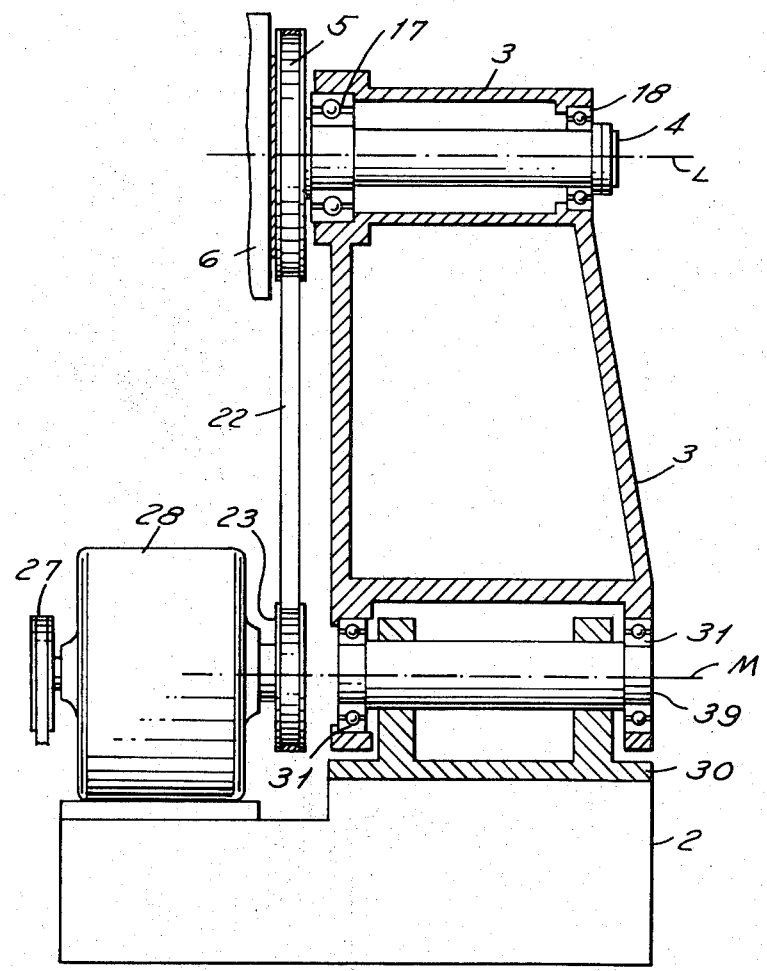

FIG. 4, a partial end view and a partial section through the device as defined by the cutting planes 4—4 as shown in FIG. 1.

FIG. 5, a group of five schematic sketches 5A, 5B, 5C, 5D and 5E, which by simple line drawings, illustrate the progression of movement through a typical index cycle.

FIG. 6, a side elevation of an alternate form of the device showing the parts in their relative positions.

FIG. 7, a kinematic line drawing illustrating the various distances and angles used in the mathematical anslysis of the device.

FIG. 8, another kinematic line drawing illustrating various distances and angles used in the mathematical analysis of another form of this device.

Figure 9:
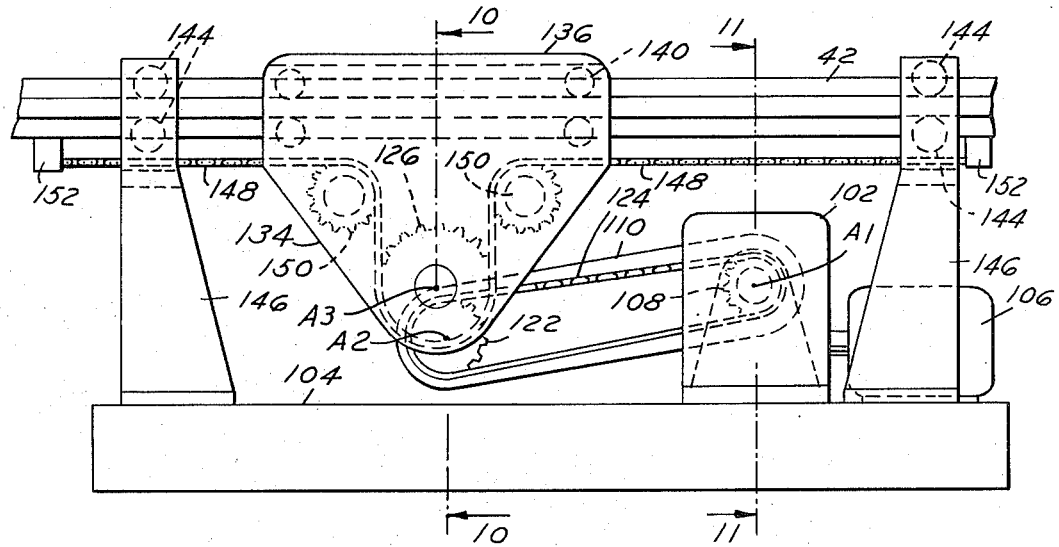

FIG. 9, a modification utilizing a chain drive.

Figure 10:
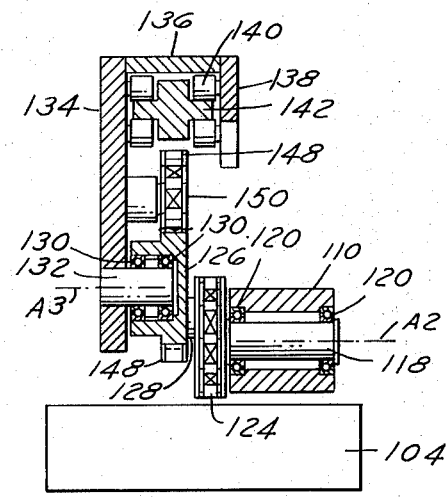

FIG. 10, a sectional view on line 10—10 of FIG. 9.

Figure 11:
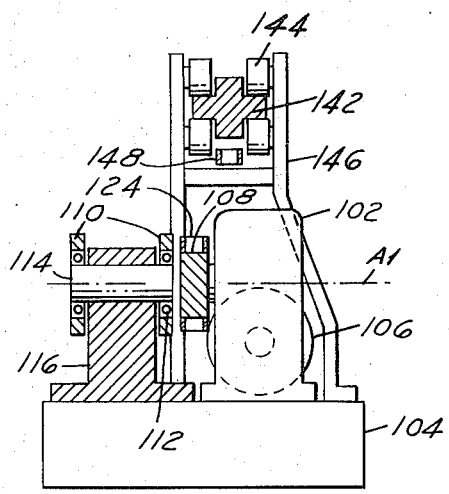

FIG. 11, a sectional view on line 11—11 of FIG. 9.

Figure 12:
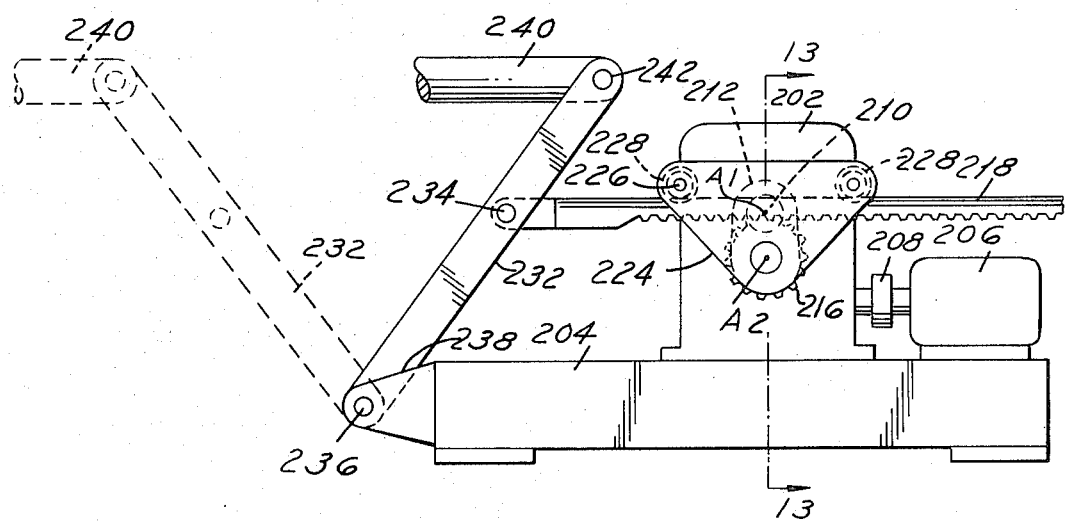

FIG. 12, a modification in which the output rack absorbs the transverse motion.

Figure 13:
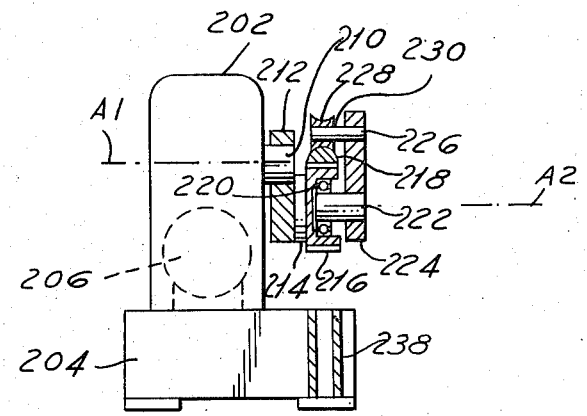

FIG. 13, a sectional view on line 13—13 of FIG. 12.

FIG. 14, a modification showing an external gear as an output member.

FIG. 15, a sectional view on line 15—15 of FIG. 14.

FIG. 16, a sectional view on line 16—16 of FIG. 14.

FIGS. 17 to 21, diagrammatic views showing differing positions in the progress of the cycle of the mechanism of FIG. 14.

FIG. 22, a modification showing an internal gear as an output member.

FIG. 23, a sectional view on line 23—23 of FIG. 22.

FIG. 24, a sectional view on line 24—24 of FIG. 22.

Figure 25:
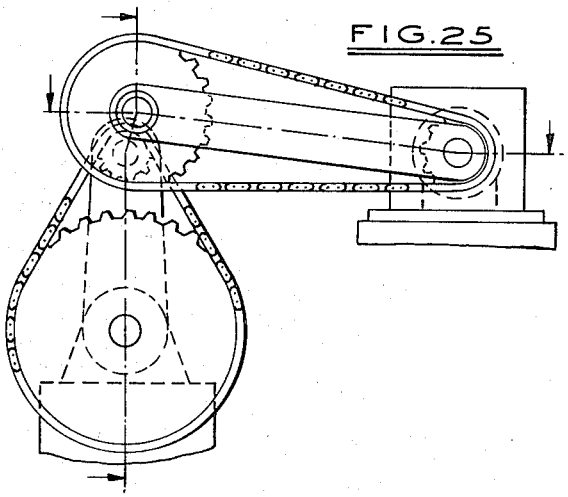

FIG. 25, a modification showing the use of an external chain to drive an output member.

Figure 26:
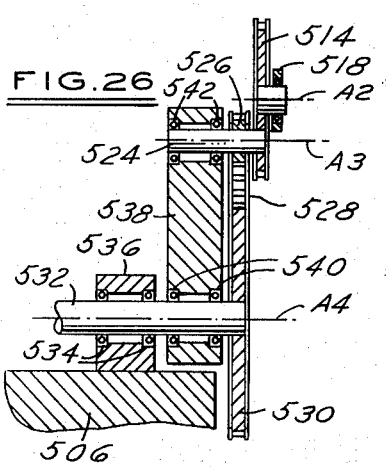

FIG. 26, a sectional view on line 26—26 of FIG. 25.

Figure 27:
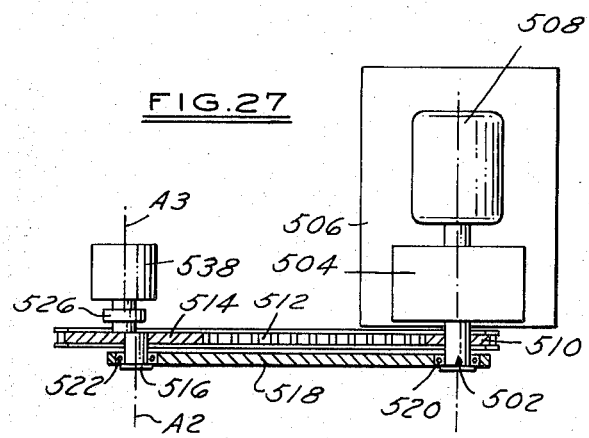

FIG. 27, a sectional view on line 27—27 of FIG. 25.

FIGS. 28 to 32, diagrammatic views showing differing positions in the progress of the cycle of the mechanism of FIG. 25.

FIG. 33, a modification showing the use of an inverted chain drive for the output member.

FIG. 34, a sectional view on line 34—34 of FIG. 33.

FIG. 35, a sectional view on line 35—35 of FIG. 33.

Referring to the drawings:

A machine base 1 carries supporting brackets 21 and 29 mounted on both ends thereof. These brackets 21 and 29 in turn support a reciprocating or indexing member 10 through two sets of guide rollers 19 and 20 which support and guide the reciprocating member 10 along its lineal path of travel.

On the bottom of the reciprocating member 10 is mounted a gear rack 7 suitably formed to mesh with a drive gear 6 mounted by a plate 6a on a sprocket 5 which in turn is mounted on a shaft 4. It will be noted (FIG. 2) that the axis L of the shaft 4 intersects the gear 6 near but not necessarily on the pitch line of the gear teeth. The gear 6 supports another shaft 13, which is mounted coaxially to the gear 6 through a suitable bearing 16 and bearing housing 15. The shaft 13 is connected to a spacer 11 whose purpose is to maintain a nominally constant distance between the true center of the gear 6 and the gear rack 7. Accordingly, this spacer 11 has mounted thereon two sets of rollers 12 which roll on opposite faces of a guide 8 mounted parallel to the rack 7.

The shaft 4 is mounted in suitable bearings 17 and 18, supported by the outboard end of the pivoted bracket 3. This pivoted bracket 3 in turn is pivot connected (FIG. 1) to a shaft 39 (FIG. 4) through bearings 31. The shaft 39 is supported from clevis 30 mounted on a suitable riser 2 from the base 1.

The shaft 4 is caused to rotate about its own axis by sprocket 5 mounted coaxially thereon, which is driven by chain 22 and sprocket 23 mounted on the output shaft of gear reducer 28. It will be seen that the axis of the output shaft of the gear reducer 28 is colinear with the stationary shaft 39 about which the bracket 3 pivots (FIG. 4). Therefore, the motion of the bracket 3 causes no change in the center distance between sprocket 5 and sprocket 23. The chain 22 and sprockets 5 and 23 could be replaced by equivalent gears with a suitable idler gear mounted to the bracket 3 and in mesh with both.

The input shaft of the gear reducer 28 is driven by pulley 27 through belt 26 from pulley 25 which is mounted on motor 24 (FIG. 1). This motor 24 is started and stopped by suitable limit switches, electrical circuits and integral or separate brake.

It will be noted that the spacer 11 and the rollers 12 mounted thereon are free to move along a line parallel to the plane of the rack, while the assembly maintains a constant distance between the center of the gear 6 and the rack 7.

The function and operational intent of the mechanism can most easily be visualized through the series of movement schematic sketches of FIG. 5. The movement will be described in one direction only. It will be understood that the return movement will be the exact inverse.

Figure 5A:
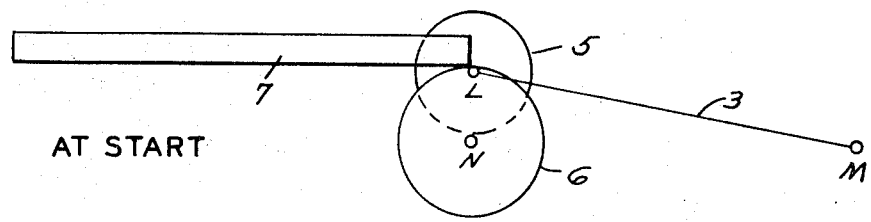
Figure 5B:
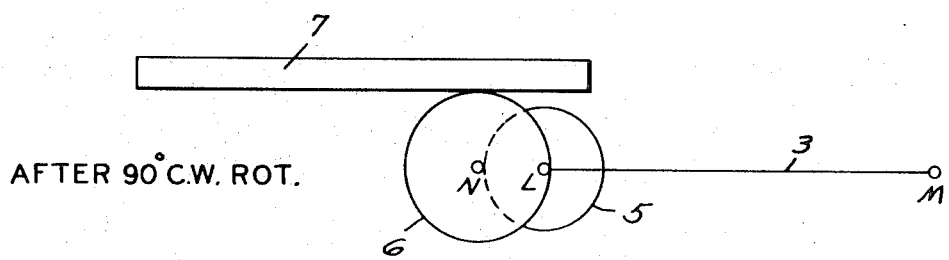
Figure 5C:
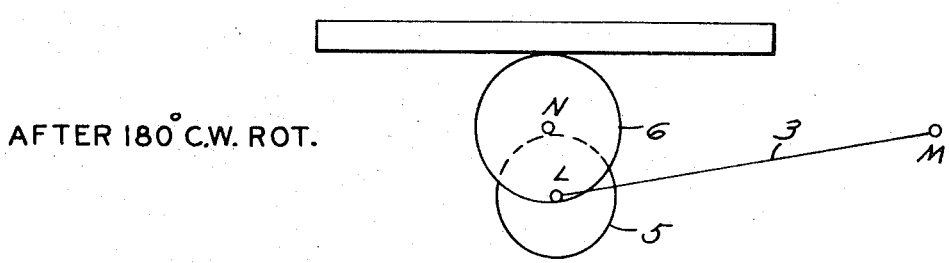

When the motor is started, the mechanism is in the dwell position as shown in FIG. 5A. This causes the gear to rotate clockwise about axis L. If the parameters are correctly chosen, this initial rotary movement of the gear 6 causes the true centerline of the gear 6 to move to the left, and slowly causes the rack 7 to accelerate and move to the right. Since spacer 11 which is not shown on these schematic sketches maintains a constant distance from the true centerline of the gear 6 to the rack 7, this relationship will be understood. As the clockwise rotation of gear 6 continues, the rack 7 is smoothly and increasingly accelerated to the right, and the axis L must move downward. After approximately 90° of clockwise rotation. FIG. 5B, the axis L has moved downward until it is in the same horizontal plane as the centerline of the gear axis N. At this point the velocity of the rack 7 is approximately the same as the absolute peripheral velocity of the pitch line of the gear. Continued clockwise rotation of the gear 6 causes the axis L to move further downward and the rack to accelerate still more, though at a decreasing rate. It will be noted that this downward movement of the axis of rotation L is accomplished through the angular movement of the pivoted bracket 3 about the fixed axis M. After approximately 180° of rotation of gear 6, as shown in FIG. 5C, the axis L has reached the bottom of its movement and the rack 7 has reached its maximum velocity to the right and is moving approximately twice the absolute peripheral velocity of the pitch line of the gear 6. At this point the acceleration of the rack 7 to the right reaches zero and it starts to decelerate.

Figure 5D:
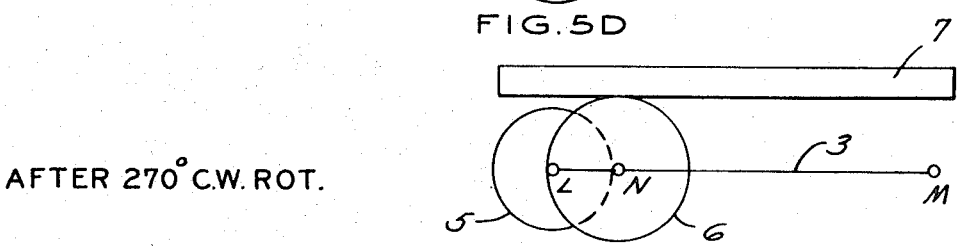
Figure 5E:
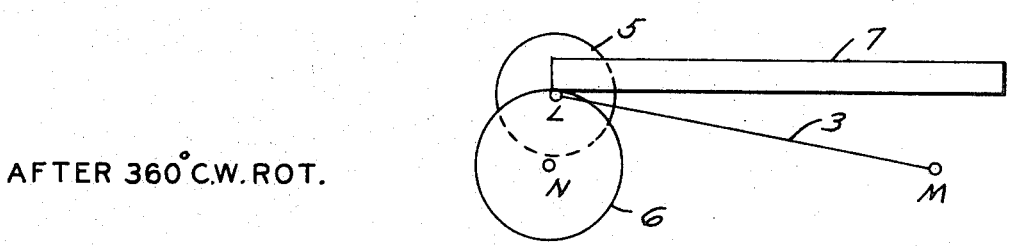

Still further rotation of the gear 6 about axis L causes the axis L to start moving upward again. After approximately 270° of rotation of the gear 6, as shown in FIG. 5D, the axis L has moved upward into the plane of the center of the gear N at which time the rack has slowed to the same velocity as the peripheral velocity of the pitch line of the gear 6. Still further rotation of the gear 6 causes the axis L to return to its initial position as shown in FIG. 5E. During this last interval of rotation of the gear 6, the rack 7 is smoothly decelerated to a stop, near stop, or slight reversal, depending on the exact geometrical relationships of various parameters which are more fully described below.

It will be seen that one revolution of the gear 6 about the oscillating axis L causes the rack 7 to index through a distance equal to the pitch circumference of the gear 6. It is further apparent that the rack will accelerate smoothly to a maximum velocity at approximate midstroke, then decelerate smoothly during the second half of the stroke, even though the gear rotates at a constant angular velocity throughout the cycle. It will be appreciated that while a rack and gear connection has been illustrated and described, a satisfactory drive relation between the rack and the gears associated with it would also fall within the spirit of the invention.

The foregoing presents a qualitative description of this device. A rigorous mathematical analysis of the device not only confirms these results but develops interesting and important interrelationships between certain geometrical parameters which permit the acceleration, velocity, displacement, and dwell characteristics of the device to be tailored to meet a variety of application requirements.

An illustrative variation of this system is shown in FIG. 6. In this instance, the gear reducer 32 and the electric motor 33 are mounted directly on the pivoting bracket 34, and the index gear is directly mounted to the output shaft 35 of the gear reducer 32. The motor drives the gear reducer through pulley 36, belt 37, and pulley 38 which is mounted on the input shaft of the gear reducer. This system, while it has the same general characteristics as the chain drive system has specific differences in the acceleration and velocity profiles which the following analysis will disclose.

FIG. 7 is a kinematic diagram, which illustrates the variables which are defined below:

The radius of the drive gear 6 is arbitrarily defined as 1 for convenience of analysis.

The radius from the true geometric center of the drive gear 6 to the axis of rotation is defined as $\lambda$.

The length of the pivoted bracket 3 from the axis of gear rotation to the axis of the bracket mounting shaft is defined as $\sigma \lambda$, which is to say the effective length of the longitudinal centerline of the bracket is $\sigma$ times as long as the radius $\lambda$.

These variables are so chosen that they are dimensionless ratios, and, as such, permit a clearer analysis of the geometrical relationships than if they were absolute quantities.

$\theta$ is the angle between the normal to the rack at the gear tangency point and the radial line $\lambda$.

$\beta$ is the angle between the radial line $\lambda$ and the longitudinal centerline of the pivoted bracket 3, defined above as $\sigma \lambda$.

U is the distance from the mounting axis of the pivoted bracket 3 to a point on the rack which was in line with the radius $\lambda$ when the angle $\theta$ was 0.

It is the object of the analysis to find the interrelationship between $\theta$ and $\lambda$ for any given value of $\sigma$ when the first derivative of U with respect to $\theta$ is zero. It is the further object of this analysis to find the relationship between $\theta$ and $\lambda$ for any given value of $\sigma$ when the second derivative of U with respect to $\theta$ is zero. The two solutions so found can then be solved simultaneously to find a unique value for $\theta$ and $\lambda$ for every unique value of $\sigma$. Stated another way, if $\theta$ is changing at a constant rate, we seek that value of $\theta$ and $\lambda$ for each value of $\sigma$ such that the velocity and acceleration of the rack will be simultaneously zero.

The desirability of this specific situation is that it creates a point of operation having a maximum practical dwell, which is to say that over a considerable range of the value of $\theta$ about this point, the change in the value of U is very small. This is of considerable practical importance since it permits a relatively wide range in the starting and stopping point of the gear with little or no change in the value of U.

Furthermore, it permits the gear to be brought up to speed by the motor before the system encounters the load imposed by the reciprocating member and permits the motor to be braked after the natural rotation of the gear has already brought the reciprocating member to a stop or near stop. Accordingly, the motor in starting must accelerate only the rotating members of the system, and, in stopping, the brake must stop only the rotating members of the system. The acceleration of the reciprocating members takes place substantially after the motor has reached its normal speed, and the deceleration of the reciprocating members is substantially completed before the motor brake is engaged.

The first derivative of the variable U with respect to the angle $\theta$ is found to be:

$$\frac{dU}{d\theta} = 1 - \lambda \cos\theta \left[1 + \frac{\sin\theta}{(\sigma^2 - 1 + \sin^2\theta)^{1/2}}\right]$$

The second derivative of the variable U with respect to the angle $\theta$ is found to be:

$$\frac{dU}{d\theta} = \lambda \left[\sin\theta - \frac{(\sigma^2-1)(1-2\sin^2\theta) - \sin^4\theta}{(\sigma^2 - 1 + \sin^2\theta)^{3/2}}\right]$$

When $dU/d\theta$ is set equal to zero and $d^2U/d\theta^2$ is set equal to zero, there can be found a unique value of $\theta$, which is defined as $\theta_N$ and a unique value of $\lambda$ for every arbitrary value of the parameter $\sigma$, which lies within the range of practical interest, approximately 2 to 10.

It must further be noted that the quantity $dU/d\theta$ is directly proportional to the real time velocity of the rack 7, and the quantity $d^2U/d\theta^2$ is proportional to the real time acceleration if, and only if, the rate of change of the angle $\theta$ constant with respect to time, that is, if $d\theta/dt = K$. Referring back to FIG. 1, it will be seen that this occurs only if the sprocket 5 and sprocket 23 are equal in diameter. If sprocket 5 and sprocket 23 are not equal in diameter, the movement of pivoted bracket 3 about its pivot point causes a relative angular movement between sprocket 5 and sprocket 23. Since it is assumed that the motor, gear reducer, and sprocket 23 rotate at constant angular velocities, sprocket 5 and gear 6 can rotate at a constant angular velocity and not be influenced by the position of the pivot bracket only when sprocket 5 and sprocket 23 are equal in diameter. The ratio of the diameter of sprocket 23 to the diameter of sprocket 5 will be defined as the dimensionless parameter $\theta$. It will be shown that this is a very useful parameter in adjusting or tailoring the characteristics of the velocity and acceleration of the rack 7 through the range of the index stroke.

We consider now the case in which the gear 6 is rotating at a constant angular velocity with respect to the pivoted bracket 3; one way by which this condition can be achieved is through the arrangement shown in FIG. 6, in which the entire drive system is mounted on the pivoted bracket 34. In this case the angle $\beta$ is changing at a constant rate with respect to real time and $d\beta/dt \neq k$. Therefore, the real time velocity of rack 7 is proportional to $dU/d\beta$ and the real time acceleration of the rack is proportional to $d^2U/d\beta^2$. The quantity $dU/d\beta$ is found to be:

$$dU/d\beta = [(\sigma^2 - \sigma\cos\beta)/(\sigma^2 + 1 - 2\sigma\cos\beta)] - \lambda\,[\sigma\sin\beta/\sigma^2 + 1 - 2\sigma\cos\beta)\,]$$

The quantity $d^2U/d\beta^2$ is found to be:

$$\frac{d^2U}{d\beta^2} = \frac{\sigma(1-\sigma^2)\sin\beta}{(\sigma^2+1-2\sigma\cos\beta)^2}$$
$$-\lambda \frac{\sigma\,[\cos\beta(1+\sigma^2-2\sigma\cos\beta) - \sigma\sin^2\beta]}{(1+\sigma^2-2\sigma\cos\beta)^{3/2}}$$

If we now apply the same criteria to $dU/d\beta$ and $d^2U/d\beta^2$ that were applied to $dU/d\theta$ and $d^2U/d\theta^2$, that is, to set each to equal zero and then solve for the unique value of $\beta$ which is termed $\beta_N$, and for the unique value of $\lambda$, for every arbitrary value of $\sigma$ within the useful range, it is found that these operating points correspond exactly to those that were found through the investigation carried out with respect to the angle $\theta$. This means that the most desirable dwell point is the same whether it is the angle $\theta$ which is changing at a constant rate with respect to real time, or whether the angle $\beta$ is changing at a constant rate with respect to real time.

While these dwell points are the same in either case, the kinematics of motion of the rack 7 during the stroke are significantly different for these different conditions, though this difference becomes smaller as the parameter $\sigma$ increases, and disappears entirely as $\sigma$ approaches infinity.

Referring back to FIG. 5, we may define two regions of operation which we will call B and D; and B region being as shown in FIG. 5B and the D region being as shown in FIG. 5D.

If gear 6 rotates at a constant angular velocity with respect to the rack, i.e., $\theta$ is changing at a constant rate relative to real time or $d\theta/dt = k$, it is found that the acceleration of the rack 7 is greater in the B region than in the D region and that this imbalance becomes greater as the parameter $\sigma$ is made smaller.

On the other hand if gear 6 is rotated at a constant angular velocity with respect to the pivoted bracket 3, i.e., the angle $\beta$ is changing at a constant rate with respect to real time or $d\beta/dt = k$, it is found that the acceleration is greater in the D region than in the B region and that this imbalance also becomes greater as the parameter $\sigma$ is made smaller.

We therefore proposed to utilize the sprocket ratio $\epsilon$, defined above, as a means to create the exact degree of acceleration imbalance desired, including the case where it is desired to create no imbalance at all. To accomplish this analytically, we introduce the angle $\psi$ which is a weighted average of the angle $\theta$ and $\beta$. The angle $\psi$ is specifically defined as follows:

$$\psi = (1 - \epsilon)\beta + \epsilon\theta$$

It can be shown that when the sprocket ratio has the value $\epsilon$, the velocity of the rack 7 has a velocity proportional to $dU/d\psi$ and the acceleration of the rack 7 is proportional to $d^2U/d\psi^2$. The angle $\psi$ is a convenient mathematical tool to derive the real time velocity and acceleration of the rack 7; as such, we cannot draw this angle $\psi$ on the kinematic diagram but content ourselves with its mathematical function.

The practical results of this analysis are that we can exercise a great deal of control on the velocity and acceleration characteristics of the rack 7 through control of the sprocket ratio $\epsilon$. If the ratio lies between 0 and 1, the velocity and acceleration characteristics lie between the limits established by the conditions where either $\theta$ or $\beta$ are changing at a constant rate relative to real time. Indeed, if $\epsilon$ is 1, we have the condition where the velocity and acceleration characteristics of the rack 7 are those derived by making the angle $\theta$ change at a constant rate relative to real time; and if $\epsilon$ is 0 we have the condition where the velocity and acceleration characteristics of the rack 7 are those derived by making the angle $\beta$ change at a constant rate relative to real time. When $\epsilon$ is made 0.5, which means the sprocket 23 is one half the diameter of sprocket 5, it is found that near perfect symmetry is restored to both the velocity and acceleration characteristics of the rack 7.

When $\epsilon$ is made greater than 1, the imbalance of the velocity and acceleration characteristics of the rack 7 is even greater and in the same direction as that found for $\theta$ changing at a constant rate relative to real time.

When $\epsilon$ is made negative or less than 0, as is possible by crossing the chain, or by eliminating an idler gear between the equivalent gears, or by using two idler gears between the equivalent gears, so as to make the gear or sprocket 5 rotate in the opposite direction from gear or sprocket 23, the imbalance of the velocity and acceleration characteristics of the rack 7 is even greater and in the same direction as that found for $\beta$ changing at a constant rate relative to real time.

Though of greater mechanical complexity, and therefore of lesser practical importance, the drive gear 5 or the entire drive system may be mounted on a slide, parallelogram linkage, or four bar linkage to achieve the same effect as the use of a simple pivot shown herein, with or without the utilization of this $\epsilon$ parameter.

We now consider another geometrical parameter $\delta$. In the foregoing disclosure the geometry of the device as shown in FIG. 7 was such that the pivot axis of the pivoted bracket 3 was placed on a line perpendicular to the normal to the rack 7 at the point of gear tangency, said perpendicular intersecting said normal one drive gear radius away from said point of tangency.

In FIG. 8 the pivot point is displaced away from said perpendicular by an amount $\delta \lambda$. Here again $\delta$ is a dimensionless parameter. The equations of motion for this condition have also been determined. It is sufficient to note that the introduction of this parameter $\delta$ also creates imbalances which can be utilized to modify the velocity and acceleration characteristics of the rack 7, and that the direction of these imbalances change as $\delta$ is made positive, as shown, or negative which would place the pivot point on the other side of said perpendicular.

The final geometric parameter to be considered is termed K. This factor has a very minor influence on the velocity and acceleration characteristics of the rack 7; it is intended to have a great influence on the dwell characteristics of the device. This K factor is defined as follows:

$$K = \frac{\text{The } \lambda \text{ factor actually used in practice}}{\text{The } \lambda \text{ factor as calculated from the differential equations}}$$

It can be shown that as the K factor is made slightly greater than unity, the velocity of the gear rack 7 becomes slightly negative at that point where the acceleration of the gear rack 7 is zero, which in practice is the center of the dwell. Practically this means that at the center of the dwell, there is a very slight reversal of motion. Extensive calculations show that a significant enlargement of the practical dwell can be achieved with an exceedingly small displacement reversal. That this is the case is a natural outgrowth of the basic premise that both the velocity and acceleration of the rack 7 should be made simultaneously zero. Conversely if K is made slightly less than 1, the rack 7 will not come to a complete stop even though its acceleration will pass through zero. This characteristic is advantageous in some applications.

A thorough study of these various relationships supports the following important conclusions:

1. In this mechanism, the shape of the velocity and acceleration profile can be controlled over a wide range by the selection of the values $\sigma$ and $\epsilon$, the latter being changeable on a completed mechanism if desired.
2. Further modification of the shape of the velocity and acceleration profile can be made by selection of the parameter $\delta$.
3. The dwell characteristics can be modified over a reasonable range by the selection of the K factor.

This device provides an extremely simple and foolproof mechanical system for indexing large or small masses over a wide range of strokes. It should be noted that the index distance is the pitch circumference of the drive gear as opposed to the diameter of such a gear in a crank type device. It is further apparent that both the acceleration and dwell characteristics are superior to those of a crank.

The device may be assembled from standard mechanical components and it requires no unusual or exotic details. The load capacity can be increased to any reasonable or practical value by the simple technique of widening the faces of the rack and drive gear and sizing the other members of the drive train accordingly. That is to say there is no penalty of scale as there is with other types of index devices.

Locking devices at the end of the stroke are not required because the natural kinematic characteristics of the device at or near the dwell point create such a large back mechanical disadvantage that the mechanism is inherently self-locking. The load capacity of this self lock is governed only by the static tooth strength of the gear and rack.

A very wide range of acceleration profile characteristics can be designed into this mechanism by judicious selection of the controlling parameters $\sigma$, $\epsilon$, and $\delta$.

There also arise applications in which multiple strokes or steps in the same direction are required, an example being the feeding of stock into presses. To achieve this multiple stepping in the same direction with this device, it is only necessary to lengthen the rack suitably, and then rotate the drive gear through the desired multiple revolutions, with or without stopping the motor at the multiple dwell points.

This device can also be applied to the rotary indexing of gears which are large relative to the drive gear as in the intermittent rotation or indexing of large turntables. In this application the straight rack is replaced with a large internal or external gear. The kinematic characteristics of the system change only very slightly when the straight rack is replaced with a curved gear and the change in the dwell characteristics is so small as to be insignificant. Furthermore, these differences become increasingly smaller as the size of the driven gear is increased relative to the size of the drive gear.

The driving mechanism is presently shown as an electric motor and suitable gear reducer; in some applications, it may be more convenient to replace this system with a pinion and rack system wherein the rack is axially moved by an air or hydraulic cylinder which in turn causes the pinion to rotate. Such a cylinder rack and pinion system may be mounted in its entirety on the pivoted bracket to create the kinematic equivalent of FIG. 6; or it may be fixed to the machine base such that the rack driven pinion replaces the output shaft of the gear reducer as shown in FIG. 1. This creates the kinematic equivalent of the basic mechanism with full freedom of choice of the parameter $\epsilon$. Either of these types of systems have the property of transforming an essentially constant velocity linear motion (the output of the cylinder) into a linear or curvilinear motion having smoothly controlled acceleration and deceleration with automatic locking at the end of each stroke. Additionally, by the choice of the pinion diameter it is possible to achieve stroke expansion or contraction.

These same cylinder rack and pinion type prime movers can be used with the circular drives described above.

Other mechanical variations which in no way affect the fundamental characteristics of this device, by way of example, are:

1. The device may be mounted in any position, e.g., it may operate with the output rack operating along a vertical or inclined line of action; it may operate with the drive gear in a horizontal or inclined plane rather than in the vertical plane shown; or more generally, it may operate in any position in space without restriction.

2. The means for guiding the output member may be a slide, parallelogram, four bar linkage, pivot, or equivalent system rather than the roller and rail system shown.

3. The means for maintaining a constant center distance between the rack 7 and the true geometric center of the drive gear 6, which is presently performed by the spacer 11, in cooperation with the guide 8 and rollers 12, may be performed by a guide system mounted from the machine base, or by a spring which loads the gear against the rack, or by a pneumatic cylinder acting as a spring to accomplish the same function.

A chain or cable operated version is shown in FIGS. 9, 10, 11 which is identical kinematically with the mechanism of FIG. 1. The interconnection between the rotating and oscillating and rotating member and the output member is accomplished by a chain or cable rather than through a rack and gear as in the previous drawings.

Referring to FIGS. 9, 10, 11, a gear reducer 102 is mounted on a base 104 and is driven by a suitable motor 106. A sprocket 108 is mounted on the output shaft of the gear reducer 102 and rotates on a fixed axis A1.

A pivoted arm 110 is connected to the base 104 through bearings 112, stationary shaft 114 and bracket 116. It will be noted that the axis of pivot for the arm 110 is coincident with axis A1. At its other end the arm 110 supports a shaft 118 in bearings 120. The shaft 118 in turn mounts a sprocket 122, which rotates on a moving axis A2. The sprocket 108 and the sprocket 122 are connected through a chain loop 124 suitably formed to mesh with the teeth on both sprockets.

Another sprocket 126 is rigidly and eccentrically mounted to the sprocket 124 through a spacer 128. The sprocket 126 rotates on bearings 130 on a shaft 132, and rotates on a moving axis A3 at some fixed eccentric distance from the moving axis A2. The shaft 132 is rigidly attached to a guide plate assembly made up of plates 134, 136 and 138. The guide plate assembly 136, 136 and 138 is guided by rollers 140, mounted in plates 134 and 138, from the output bar 142. The output bar 142 in turn is supported and guided by rollers 144 mounted in brackets 146 connected to the base 104.

The output bar 142 is moved horizontally with respect to the base 104, and the guide plate assembly 134, 136 and 138 may move horizontally with respect to the output bar 142.

The sprocket 126 is connected to the output bar 142 through a chain strand 148; this chain 148 passes over idler sprockets 150 rotatably mounted on bosses on the guide plate 134. The ends of the chain 148 are connected to the output bar 142 through anchor blocks 152. It will be noted that this chain 148 is threaded from one anchor block 152 around an idler sprocket 150, then in driving engagement with the sprocket 126, around the second idler sprocket 150 and is finally connected to the second anchor block 152.

The mechanism in FIG. 9 is shown in the approximate dwell position, i.e., a small angular rotation of the input sprocket 108 will cause a negligible movement of the output bar 142. The operational function of the mechanism during dwell and index may be understood by considering the following sequence. The sprocket 108 is rotated clockwise through some small angle clockwise; this causes a proportionate angular movement of the sprocket 122 about axis A2 as driven by the chain 124. The sprocket 126 rotates an equal amount about the axis A3 moving the chain strand 148 in a direction to move the output bar 142 to the left. However, the rotation of the sprockets 122 and 126 causes the axis A3 to rotate clockwise about axis A2, shifting the guide assembly 134, 136 and 138 to the right. With the proper parameters, this motion exactly cancels the movement of the chain strand 148 and the output bar remains nominally stationary.

It should be noted that axes A2 and A3 move during the operation of the mechanism although they remain a fixed distance apart. The movement of axis A3 is an oscillation along a path parallel to the direction of the motion of the output bar 142, while the movement of axis A2 is an oscillation along a path which is an arc about the fixed axis A1; the path of A2 is therefore generally transverse to the path of A3.

After the sprockets 122 and 126 have rotated approximately 90°, the axis A2 has moved upward into the same horizontal plane as axis A3 and the guide assembly 134, 136 and 138 is now momentarily stationary in its most right position. The linear motion of the output bar is therefore to the left due to the clockwise rotation of sprocket 126 only, since the now stationary guide assembly 134, 136, 138 does not cancel out any of this movement.

After the sprockets 122 and 126 have rotated approximately 180°, the axis A2 is approximately directly above axis A3 and the guide assembly 134, 136 and 138 is moving to the left; this motion is additive to the drive by the chain 148 on the output bar 142, and the total velocity of the output bar is nominally twice that due to the sprocket 126 driving chain 148.

After 360° of rotation of sprocket 122 and sprocket 126, the axis A2 is again nominally directly below axis A3 and a dwell condition is again reached.

As above pointed out, the quantitative characteristics of motion are exactly the same as those achieved with the rack and gear system of FIGS. 1 and 6.

An inverted version of this same basic system of FIGS. 1 and 6 is shown in FIGS. 12 and 13. In this instance, the output member is again a rack in mesh with a gear rotating about an eccentric centerline; however, the rack and not the gear moves transversely to the direction of output, producing nominally the same output characteristics as before.

Referring to FIGS. 12 and 13, a gear reducer 202 is mounted on a base 204 and is driven by a motor 206 through a coupling 208. The output shaft 210 of the gear reducer 202 rotates about a fixed axis A1 and has mounted on it an eccentric plate 212 through a rigid connection.

A stub shaft 214 and gear 216 are mounted on the plate 212 on an axis A2 which is eccentric to the axis A1. A rack 218 is suitably formed to mesh with the gear 218. The pitch line of the rack 218 is maintained in tangential contact with the pitch circle of the gear 216 by a guide assembly made up of bearing 220, shaft 222, plate 224, two shafts 226, and two rollers 228. The bearing 220 is mounted in the gear 216 and controls the position of the shaft 222 to maintain it on the gear centerline axis A2. The shaft 222 is rigidly connected to the plate 224, which in turn supports two other shafts 226. A roller 228 is free to rotate on each of these shafts 226 on bushings 230. The outside diameters of the rollers 228 contact the rack 218 and in so doing maintain the rack 218 in engagement with the gear 216 during its eccentric rotation.

The rack 218 is connected to a link 232 through a pin 234; the link 232 in turn is pivotally connected to the base 204 through a pin 236 and a bracket 238. A suitable interconnecting member 240 is connected to the link 232 by pin 242. This member 240 drives the output load with the desired acceleration deceleration characteristics through a stroke determined by the geometrical characteristics of the mechanism. With the proper choice of eccentricity, i.e., the distance between axis A1 and A2, the kinematic characteristics of the output are such that the velocity and acceleration are simultaneously zero at each end of the stroke. A typical stroke is shown by the dotted line positions of link 232 and 240.

It will be understood that the pivoted connection of the rack 218 at pin 234 may be to any driven member whose movement at such a driven point is along a path nominally in a direction along the axis of the rack. The relevant difference between this and the previously described systems is that in this instance the rack moves transversely relative to the axis of rotation A1 to maintain a fixed relationship to the gear axis A2, whereas in the previously described system, the axis of rotation moved transversely to the rack; in relative terms, the systems are nominally comparable.

Referring to FIGS. 14, 15 and 16, the input shaft 302 of the indexing system is the output shaft of a suitable prime mover assembly 304 mounted to the frame 306. This prime mover assembly 304 may be a hydraulic motor, air motor, electric motor, or some other suitable power source operating directly or through an appropriate gear reduction.

The input shaft 302 rotates on an axis A1; a stationary shaft 308, nominally concentric with axis A1, is mounted on a bracket 310 which is in turn mounted to the frame 306. A tangential link 312 is connected to the shaft 308, through bearings 309. The other end of the tangential link 312 supports a shaft 314 through bearings 316 which rotates on a moving axis A2.

A sprocket 318 is mounted on shaft 314 and is driven by a chain 320 from sprocket 322 which is mounted on shaft 302. An eccentric 324 is rigidly mounted on shaft 314 and in turn supports a stub shaft 326 and gear 328 concentric about a moving axis A3 which is eccentric from axis A2. The gear 328 is formed to mesh with a gear 330 which is the output member. The gear 330 is mounted on a shaft 332 which rotates about an axis A4; the shaft 332 is mounted in bearings 334 in frame 306.

The center distance between gear 328 and the output gear 330 is determined and maintained by a radial link 336 which is connected at one end to the stub shaft 326 by bearing 338 and at the other end it is connected to the shaft 332 by bearing 340.

The kinematics of the system is such that when the input shaft 302 is rotated by the prime mover assembly at some constant angular velocity, the shaft 314 rotates about its axis A2, and the gear 328 rotates about its axis A3. However, the axis A2 and A3 rotate about each other and the axis A2 oscillates about a path approximately radial from the output axis A4, while the axis A3 oscillates about a path which is an arc about A4. It is this oscillation of the axis A3, when superimposed on the rotation of the gear 328, which causes the rim of the output gear 330 to cyclically accelerate and decelerate in a curvilineal motion for each revolution of the gear 328. The magnitude of this superimposed cyclical velocity fluctuation is dependent on the amount of eccentricity between axes A2 and A3. For every practical combination of values of distance from the center of the input axis A1 to the center of the output axis A4, center distance length of the radial link 326 and center distance length of the tangential link 312, there is a value of eccentricity, the distance from axis A2 to axis A3, which will cause the output gear to stop momentarily at one point for each revolution of the gear 328.

Of course, it is not necessary for the input shaft 302 to rotate at a constant angular velocity. The intermittent index characteristics of the system described are also realized when the input rotation is of a non-uniform nature. However, the dynamic characteristics of the system are modified to the extent that the input rotation is non-uniform.

The qualitative behavior of the system during an indexing cycle may be visualized by reference to FIGS. 17–21, a series of five simplified schematic sketches illustrating the progressive positions of the components assuming a four station, 90° index of the output sprocket. This is achieved when the output gear 330 has a pitch diameter four times as great as the pitch diameter of the gear 328.

In FIG. 17, the drive is shown in a dwell position of the output gear; this means that a slight movement of the input shaft 302 in either direction, for example, plus or minus 10°, will cause an extremely small movement of the output gear 330.

In FIG. 18, the gear 328 has been rotated approximately 90° clockwise relative to the link 320 centerline.

However, this angular rotation of gear 328 has also been accompanied by a 90° rotation of axis A2 and A3 about each other, causing the link 336 to move clockwise about axis A4, which in effect reduces the amount of counterclockwise movement of the output gear 330. Therefore, during the first approximately 90° or one-fourth of the input movement, the output sprocket has moved only approximately 7°.

In FIG. 19, the gear 328 has been rotated approximately 180° clockwise from its initial position relative to the link 312. During this interval of rotation, the axes A2 and A3 have also rotated an additional 90° about each other, causing the link 336 to move counterclockwise about axis A4, which in effect increases the amount of counterclockwise movement of the output gear 330. Therefore, during the second approximately 90° or one-fourth of the input movement, the output gear has rotated approximately 38° and during the total 180° or one-half of the input movement, the output gear has now rotated approximately 45°.

In FIG. 20, the gear 328 has been rotated approximately 270° clockwise from its initial position relative to the link 312. During this interval of rotation, the axes A2 and A3 have also rotated an additional 90° about each other, causing the link 336 to move still further counterclockwise about axis A4, which again in effect increases the amount of counterclockwise movement of the output gear 330. Therefore, during the third approximately 90° or one-fourth of the input movement, the output gear 330 has again rotated approximately 38°, and during the total 270° or three-fourths of the input movement, the output sprocket has now rotated approximately 83°.

In FIG. 21, the gear 328 has been rotated approximately 360° clockwise from its initial position relative to the link 312. During this final interval of rotation, the axes A2 and A3 have also rotated an additional 90° about each other, causing the link 336 to again return to a clockwise direction about the stationary axis A4, which in effect again decreases the amount of counterclockwise movement of the output gear 330. Therefore, during the final 90° or one-fourth of the input movement, the output gear 330 has again rotated approximately 7° and during the total 360° rotation of the gear 328, the output gear 330 has rotated 90°.

The amount of output gear 330 rotation per index cycle is controlled by the ratio of the number of teeth between gear 330 and gear 328, or by the ratio of their pitch diameters. One complete 360° rotation of the gear 328 creates one index cycle.

The foregoing is a qualitative step-by-step description of an index cycle. A detailed precision kinematic analysis of the system described in this disclosure, using computer techniques, in addition to conventional calculus methods, indicates that an extremely wide variety of useful output movement characteristics may be achieved by appropriate selection of the input parameters.

The basic acceleration profile is of a cycloidal nature with the addition of higher harmonics whose magnitude and phase may be controlled by the interrelationship of the fixed geometrical parameters.

It is possible to compute a specific value of eccentricity, the distance from axis A2 to axis A3, for fixed values of center distance, the distance from axis A1 to axis A4, and for fixed values of length of the idler link 318 and the support link 338 such that the output sprocket reaches a full stop during each index cycle. It is further possible to calculate eccentricities which modify the dwell characteristics such that the output sprocket does not reach a full stop or that it reverses slightly during the center of the theoretical dwell period. It is also possible to compute eccentricities which create predetermined cyclical speed variations between specified limits.

In addition to the three modes of the external gear indexing systems described above, a second basically different system will now be described. The distinguishing difference is that the output gear is an internal gear. This not only changes the direction of output rotation relative to input rotation but again introduces minor kinematic changes.

Referring to FIGS. 22, 23 and 24, the input shaft 402 of the indexing system rotates on a fixed axis A1 and is the output shaft of a suitable prime mover 404 mounted to the frame 406. This prime mover 404 may be a hydraulic motor, air motor, electric motor, or some other suitable power source operating directly or through an appropriate gear reduction.

A stationary shaft nominally concentric with axis A1 is mounted on a bracket 410 which is in turn mounted to the frame 406. A tangential link 412 is connected to the shaft 408 through bearings 409. The other end of the tangential link 412 supports a shaft 414 through bearings 416 which rotates on a moving axis A2.

A sprocket 418 is mounted on shaft 414 and is driven by a chain 420 from a sprocket 422 which is mounted on the shaft 402. An eccentric 424 is rigidly mounted on shaft 414 and in turn supports a stub shaft 426 and gear 428 concentric about a moving axis A3 which is eccentric from axis A2. The gear 428 is formed to mesh with a gear 430 which is the output member the rim of the gear moving in a curvilineal path. The gear 430 is mounted on a shaft 432 which rotates about a fixed axis A4; the shaft 432 is mounted in bearings 434 in the frame 406.

The center distance between the gear 428 and the output gear 430 is determined and maintained by a radial link 436 which is connected at one end to the stub shaft 426 by a bearing 438 and at the other end it is connected to the shaft 432 by bearing 440.

It can be seen that this internal gear system is a complete analog of the external gear system shown in FIGS. 14, 15, 16. The indexing characteristics are approximately the same. In most applications, the mechanical characteristics will determine which system is chosen.

In the internal gear system as shown in FIGS. 22, 23 and 24, the input power was introduced into a shaft on the stationary axis A1. It will be recalled that in the external gear system, three modes or versions were described, with the input power introduced on the stationary axis A1, or on the moving axis A2, or on the moving axis A3. These same techniques may be applied to the internal gear indexing system shown in FIGS. 22, 23 and 24, i.e., a suitable driving prime mover may be mounted on the link 412 and apply power directly to the shaft 414; or a suitable prime mover may be mounted on the link 436 and apply power directly to the shaft 432.

Furthermore, the indexing system may be incorporated as part of a larger system and thereby acquire its input power from such a larger system without utilizing a separately powered prime mover.

Referring to FIGS. 25, 26 and 27, the input shaft 502 of the indexing system is the output shaft of a suitable gear reducer 504 mounted on a frame 506. A suitable prime mover such as an electric motor 508 is also mounted on frame 506 and provides power to the gear reducer 504.

An input sprocket 510 is mounted to the input shaft 502 which rotates on fixed axis A1 and drives a chain 512 connected to an idler sprocket 514 which rotates about a movable axis A2. A stub shaft 516 is rigidly connected to idler sprocket 514 concentric with axis A2. A fixed center distance is maintained between axes A1 and A2 by a tangential link 518 connected at one end to input shaft 502 through bearing 520 and at its other end to shaft 516 by bearing 522.

A support shaft 524 rotating about movable axis A3 is rigidly connected to sprocket 514 such that the axis A3 is eccentric to the centerline axis A2. An intermediate sprocket 526 is rigidly and concentrically mounted on shaft 524. This intermediate sprocket 526 drives a chain 528 connected to an output sprocket 530 mounted on the output shaft 532, which rotates about a fixed axis A4. The output shaft 532 rotates in bearings 534 mounted in support brackets 536 which is in turn mounted to frame 506.

A fixed distance is maintained between axes A4 and A3 by a radial link 538 which is mounted on one end by bearings 540 to output shaft 532 and at its other end the radial link 538 is connected to the support shaft 524 through bearings 542.

The kinematics of the system is such that for any practical given set of fixed distances between axes A1 and A4, between axes A1 and A2, and between axes A3 and A4, it is possible to find a distance between axis A2 and A3 such that if input sprocket 510 is rotated at a constant angular velocity, the output sprocket will index intermittently, reaching a periodic full stop at angular intervals determined by the ratio of the intermediate sprocket 526 to the output sprocket 530.

The qualitative behavior of the system during an indexing cycle may be visualized by reference to FIGS. 28 to 32, a series of five simplified schematic sketches illustrating the progressive positions of the components, assuming a six station (60°) index.

Figure 28:
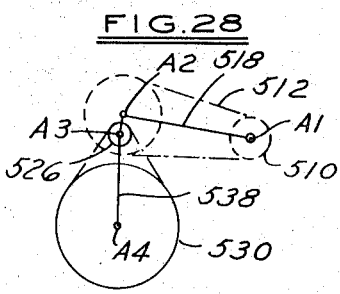

In FIG. 28, the drive is shown in a dwell position of the output sprocket; this means that a slight movement of the input sprocket in either direction, for example, plus or minus 10°, will cause no practical movement of the output sprocket.

Figure 29:
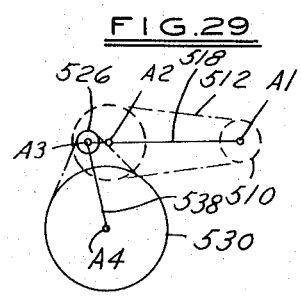

In FIG. 29, the idler sprocket 514 has been rotated approximately 90° in the clockwise direction, relative to the link 518 centerline; since the intermediate sprocket 526 is rigidly connected to the idler sprocket 514, it too has rotated approximately 90° clockwise. However, during this interval, this angular rotation of the sprocket pair (514 and 526) has caused the link 538 to move counterclockwise about axis A4, which in effect reduces the amount of output sprocket movement. Therefore, during the first approximately 90° or one-fourth of the input movement, the output sprocket has moved only approximately 5°.

Figure 30:
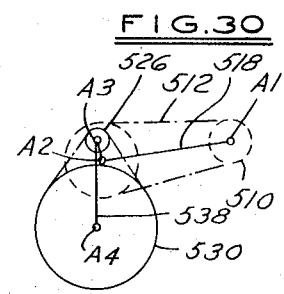

In FIG. 30, the idler sprocket 514 and the intermediate sprocket 526 have been rotated approximately 180° clockwise from their initial position. During this interval of rotation from approximately 90° to approximately 180°, this angular rotation of the sprocket pair (514 and 526) has caused the link 538 to move clockwise about axis A4, which in effect increases the amount of output sprocket angular movement. Therefore, during the second approximately 90° or one-fourth of the input movement, the output sprocket has rotated approximately 25°, and during the total 180° or one-half of the input movement, the output sprocket has now rotated approximately 30°.

Figure 31:
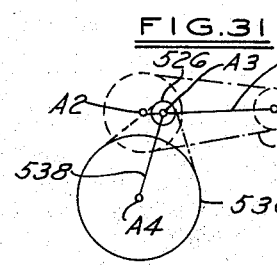

In FIG. 31, the idler sprocket 514 and the intermediate sprocket 526 have been rotated approximately 270° clockwise from their initial position. During the interval of rotation from approximately 180° to approximately 270°, this angular rotation of the sprocket pair (514 and 526) has caused the link 538 to continue to move clockwise about axis A4 which in effect still increases the amount of output sprocket angular movement. Therefore, during the third approximately 90° or one-fourth of the input movement, the output sprocket has again rotated approximately 25°, and during the total 270° or three-fourths of the input movement, the output sprocket has now rotated approximately 55°.

Figure 32:
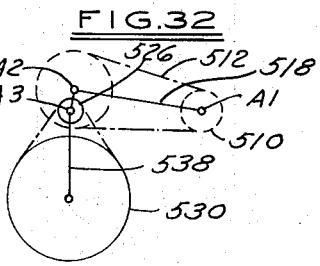

In FIG. 32, the idler sprocket 514 and the intermediate sprocket 526 have been rotated approximately 360° clockwise from their initial position. During the interval of rotation from approximately 270° to approximately 360°, this angular rotation of the sprocket pair (514 and 526) has caused the link 538 to move counterclockwise about axis A4, which in effect again decreases the rate of output sprocket angular movement. Therefore, during the fourth approximately 90° or one-fourth of the input movement, the output sprocket has again rotated approximately 5°, and during the total 360° of the input movement, the output sprocket has rotated 60°.

The amount of output sprocket 530 rotation per index cycle is controlled by the ratio of the pitch diameter of the intermediate sprocket 526 to the pitch diameter of the output sprocket 530, or to the ratio of their respective teeth. One complete 360° rotation of the intermediate sprocket 526 creates an index cycle.

As previously indicated, a detailed precision kinematic analysis of the mechanism described in this disclosure, using computer techniques, in addition to conventional calculus methods, indicates that an extremely wide variety of useful output movement characteristics may be achieved by appropriate selection of the input parameters.

In addition to the modes of the normal indexing system described above, a second basically different system will now be described. The distinguishing difference of this "inverted" system is that the direction of rotation of the output sprocket, relative to the rotation of the other rotating shafts in the system, has been reversed.

This inverted system is shown in FIGS. 33, 34 and 35. The input shaft 602 of the indexing system is the output shaft of a suitable gear reducer 604 mounted on a frame 606. A suitable prime mover such as an electric motor 608 is also mounted on frame 606 and provides power to the gear reducer 604.

An input sprocket 610 is mounted to the input shaft 602 which rotates on a fixed axis A1 and drives a chain 612 connected to a sprocket 614 which rotates about a movable axis A2. A stub shaft 616 is rigidly connected to the sprocket 614 and concentric with the axis A2; a fixed center distance is maintained between axes A1 and A2 by a tangential link 618 connected at one end to input shaft 602 through bearing 620 and at its other end to shaft 616 by bearing 622.

A support shaft 624, rotating about movable axis A3, is rigidly connected to sprocket 614 such that the axis A3 is eccentric to the centerline axis A2. An intermediate sprocket 626 is rigidly and concentrically mounted on shaft 624; this intermediate sprocket 626 drives a chain 628 connected to an output sprocket 630 mounted on the output shaft 632 which rotates about a fixed axis A4. The output shaft 632 rotates in bearings 634 mounted in support bracket 636 which in turn is mounted to frame 606.

A fixed distance is maintained between axes A4 and A3 by a radial link 638 which is mounted on one end by bearings 640 to output shaft 632 and at its other end; the radial link 638 supports the shaft 624 through bearings 642. Additionally, the link 638 supports two idler shafts 644 through suitable bearings. Each idler shaft 644 carries an idler sprocket 646 which lies within the chain loop 628. It is the purpose of these idler sprockets 646 to thread the chain loop 628 such that the sprocket 626 and the sprocket 630 rotate in opposite directions. Not only is this of mechanical convenience in some applications, but the kinematic characteristics are specifically different from those of a normal system although the broad general characteristics are similar.

In the "inverted" system as shown in FIGS. 33, 34 and 35, the input movement was introduced into a shaft on the stationary axis A1.

In the normal system, the modes described could have the input power introduced on the stationary axis A1, or on the moving axis A2, or on the moving axis A3. These same techniques may be applied to the inverted system described above, i.e., a suitable driving prime mover may be mounted on the link 618 and apply power directly to the shaft 616, or a suitable prime mover may be mounted on the link 638 and apply power directly to the shaft 624.

Furthermore, the indexing system may be incorporated as part of a larger system and thereby acquire its input power from such a larger system without utilizing a separately powered prime mover.

In both the normal system and the inverted system, the guide system for the axis A2 has been shown as a link which maintains that axis A2 at some constant distance from a fixed axis A1. Other types of guides may also be utilized, the significant criterion being that the axis A2 be restrained to move along a path generally transverse to the path of the oscillating axis A3. Examples of such equivalent guide systems would be a slide, or roller and groove, or four bar linkage to control the path of the axis A2.

Similarly, the guide system for the axis A3, which was shown as a link to maintain the axis A3 at some nominally constant distance from the output axis A4, may also utilize a variety of other techniques, the significant criterion again being that the axis A3 be restrained to move along a path which is an arc whose center is the output axis A4. Examples of such equivalent guide systems would be an arcuate slide, or a roller in a curved groove to maintain the axis A3 at the fixed distance from A4, yet permit A3 to oscillate about this path.

In essence, the system will operate in three basic versions or modes. In the first, with power supplied on the fixed axis A1; in the second, with power supplied on the moving axis A3; and in the third, with power supplied on the moving axis A2. Aside from minor kinematic differences, the same general characteristics may be achieved with old modes; in most cases, the choice of mode will be made on the basis of mechanical convenience, rather than on the basis of minor kinematic differences.

I claim:

1. An apparatus for transmitting rotary motion into an output motion having a predetermined acceleration and velocity which comprises:
   a. an output member,
   b. a gear section mounted on said output member,
   c. means mounting said output member to guide it in a predetermined path,
   d. a first gear to engage said gear section and drive said output member,
   e. means guiding said first gear for rotational motion about its own center as said center oscillates along a path parallel to said output member to effect motion of said output member,
   f. a rotative drive member,
   g. means guiding said rotative drive member for movement in a path relatively generally transverse of said path of said output member,
   h. means mounting said first gear in a non-rotational relation to said drive member with axes of said first gear and member parallel but spaced from each other wherein power rotation of said drive member causes it to rotate relatively about the center of said first gear, and
   i. means to drive said rotative drive member to impart a rotation to said first gear while in driving engagement with said gear section.

2. An apparatus for transmitting rotary motion into an output motion having a predetermined acceleration and velocity which comprises:
   a. an output member,
   b. a drive surface on said output member,
   c. a rotary member to engage said drive surface in a tangential drive relationship,
   d. means mounting said output member to guide said drive surface in a predetermined path,
   e. means mounting said rotary member for rotational motion about its moving center and in driving engagement with said drive surface of said output member,
   f. a rotative drive member,
   g. means mounting said rotative drive member for movement in a path generally transverse of said path of said drive surface of said output member,
   h. means mounting said rotary member in non-rotational relation to said drive member with the axes of said rotary member and said drive member parallel but spaced from each other wherein power rotation of said drive member causes it to rotate about the moving center of said rotary member, and
   i. means to drive one of said members to impart a rotation to said rotary member while in driving relationship with said drive surface.

3. An apparatus for transmitting rotary motion into an output motion having a predetermined acceleration and velocity which comprises:
   a. an output member having a drive surface,
   b. a first rotary drive member having a peripheral drive surface, c. means mounting said output member for movement wherein said drive surface has a predetermined path, d. means mounting said first rotary drive member for rotational motion about a first axis as said first axis moves along a path substantially parallel to said drive surface of said output member, e. means drivingly interconnecting the drive surface of said output member with the drive surface of said rotary drive member, f. a second rotary drive member, g. means mounting said second rotary drive member for rotation about a second axis and for movement in a path generally transverse of said path of said drive surface of said output member, h. means mounting said first rotary drive member in non-rotational relation to said second rotary drive member with the axes of said drive members parallel but spaced from each other wherein power rotation of said second rotary drive member causes it to revolve about the moving center of said first rotary drive member, and i. means to drive one of said rotary drive members to impart a rotation to the other of said rotary drive members.

4. An apparatus for transmitting rotary drive motion in a predetermined output motion having a predetermined acceleration and velocity which comprises:
a. a rack to be driven in an output motion;
b. a first gear to engage and drive said rack,
c. a rotative power input drive member mounted to rotate about a first axis, said first gear being non-rotatively mounted on said drive member with the center of the first gear off center from said first axis,
d. means to retain said rack and said first gear in engagement during rotation of said first gear, and
e. means to mount and drive said member in rotative movement about said first axis wherein the center of said first gear moves in a direction generally transverse relatively to the output motion of said rack, said rack moving also in a direction transverse its length while moving longitudinally in an output motion.

5. In an indexing mechanism wherein a nominally constant input movement causes a cyclical variation in the output movement including momentary stoppage of said output movement comprising:
a. a frame,
b. an output member connected to said frame and rotating about an output axis,
c. a first drive member rotating about a movable first axis and in tangential driving engagement with said output member,
d. a first guide means to mount said drive member to move along a path such that said driving engagement is maintained,
e. a power input means rotating about a movable second axis and connected to said first drive member wherein said first axis and said second axis are parallel and non-coincident,
f. a second guide means mounting said power input means on said frame wherein said power input means may move such that said second axis is guided along a path generally transverse to the path of said first axis as guided by said first guide means, whereby rotation of said power input means about said second axis causes said power input means to oscillate about a path controlled by said second guide means and said first drive member rotates about said first axis while said first drive member moves in a path controlled by said first guide means, and said first and second axes revolve about each other.

6. An indexing mechanism as defined in claim 5 in which output member is a gear having a curved toothed drive surface, and said first drive member is a gear having peripheral teeth to engage said drive surface.

7. An indexing mechanism as defined in claim 6 in which said first guide means comprises a link rotatably associated with a support axle at said output axis of said output gear and carrying said first drive member.

8. In an indexing mechanism wherein a nominally constant input movement causes a cyclical variation in the output movement including momentary stoppage of said output movement comprising:
a. a frame,
b. an output member connected to said frame and rotating about an output axis and having a peripheral drive surface,
c. a first drive member mounted to rotate about a movable first axis having a peripheral drive surface,
d. a first guide means to mount said drive member to maintain constant the center distance between the axis of said output member and the axis of said drive member,
e. an input drive member mounted on said frame to rotate about a fixed input axis,
f. a second drive member mounted to rotate about a movable second axis, said second drive member being rigidly connected to said first drive member such that said first axis and said second axis are parallel and non-coincident,
g. a second guide means to mount said second drive member wherein said second axis moves along a path such that said second axis is maintained at a nominally constant distance from said input axis, and
h. a first peripheral drive means in a continuous loop connecting the drive surfaces of said output member and said first drive member, and a second peripheral drive means in a continuous loop connecting the periphery of said input member to the periphery of said second drive member such that a rotation of said input drive member causes a rotation of said second drive member about said second axis while said second axis oscillates about a path controlled by said second guide means and said first drive member rotates about said first axis while said first axis oscillates about a path controlled by said first guide means, and said first axis and second axis revolve about each other.

9. An indexing mechanisn as defined in claim 8 in which said guide means each comprise a link rotatably associated at each end with an axle portion of said respective first drive member and output member and said second drive member and input drive member.

10. In an indexing mechanism wherein a nominally constant input movement causes a cyclical variation in the output movement including momentary stoppage of said output movement comprising:
a. a frame, b. an output member connected to said frame and rotating about an output axis and having a peripheral drive surface, c. a first drive member mounted to rotate about a movable first axis having a peripheral drive surface, d. a first guide means to mount said drive member to maintain constant the center distance between the axis of said output member and the axis of said drive member, e. an input drive member mounted to rotate about a movable second axis, said input drive member being rigidly connected to said first drive member such that said first axis and said second axis are parallel and non-coincident, f. a second guide means to mount said input drive member wherein said second axis moves in a fixed path, g. means to drive said input drive member, and h. a peripheral drive means in a continuous loop connecting the drive surfaces of said output member and said first drive member wherein rotation of said input drive member causes a revolving of said input drive member about said second axis while said second axis oscillates about a path controlled by said second guide means and said first drive member rotates about said first axis while said first axis oscillates about a path controlled by said first guide means, and said first and second axes revolve about each other.

11. An apparatus for transmitting rotary motion into an output motion having a predetermined acceleration and velocity pattern which comprises:

a. an output member having a driven portion, b. means mounting said output member for motion of said driven portion thereof in a predetermined path, c. a first rotary member mounted to rotate about a first axis having a fixed relationship to said predetermined path of said driven portion, d. means to maintain said fixed relationship between said driven portion of said output member and said first axis of said first rotary member, e. means connecting said first rotary member and said output member wherein rotation of said first rotary member produces a relative motion of said driven portion of said output member and said first rotary member, f. a second rotary member mounted on a second axis parallel to and spaced from said first axis, g. means connecting said rotary members wherein rotation of said first rotary member causes said second rotary member to revolve about said first axis, h. means to constrain the motion of said second rotary member wherein said second axis moves relative to the output member in a path generally transverse of said motion path of the driven portion of said output member, and i. means to drive one of said rotary members in rotation to effect movement of said driven portion of said output member in a predetermined acceleration and velocity pattern.

12. An apparatus as defined in claim 11 in which said means connecting said first rotary member and said output member comprises interengaging gear teeth on said respective members.

13. An apparatus as defined in claim 11 in which said means connecting said first rotary member and said output member comprises teeth on said respective members and a flexible drive member interconnecting said teeth.

14. An apparatus as defined in claim 11 in which said means connecting said first rotary member and said output member comprises teeth on said first rotary member and a chain on said output member.

15. An apparatus as defined in claim 11 in which said output member and said first rotary member comprises a rack and gear and said means to maintain a fixed relationship therebetween comprises a spacer plate mounted to respectively engage said output member and said first rotary member.

16. An apparatus as defined in claim 11 in which said output member comprises a substantially circular member rotating about a fixed fourth axis and said means to maintain a fixed relationship between said driven portion of said output member, and said first axis of said first rotary member comprises a spacer link, means rotatably mounting said first rotary member on said spacer link at said first axis and means pivotally mounting said link on said fourth axis.

17. An apparatus as defined in claim 11 in which said means to constrain the motion of said second rotary member comprises an arm, means rotatably mounting said second rotary member on said arm at said second axis, and means pivotally mounting said arm on a fixed third axis spaced from said second axis.

18. An apparatus as defined in claim 17 in which said means to drive said one of said rotary members is mounted on said arm in rotary driving engagement with said second rotary member.

19. An apparatus as defined in claim 11 in which said second rotary member actuates about a fixed said second axis and said means mounting said output member permits said output member to move in a direction substantially transverse to the said driven portion thereof and said means to maintain said fixed relationship between said driven portion of said output member and said first axis of said first rotary member comprises a spacer plate to respectively engage said output member and said first rotary member.

20. An apparatus for transmitting rotary motion into an output motion having a predetermined acceleration and velocity pattern which comprises:

a. an output member having a rack section to be moved lineally along a predetermined path, b. means mounting said output member to confine it for lineal motion of said rack section, c. a first rotary member in the form of a gear having engagement with said rack and rotatable about a first axis, d. a spacer means movable parallel with said output member along said predetermined path and means mounting said first rotary member on said spacer means on an axis perpendicular to a plane which includes said path, e. a second rotary member mounted on a second axis parallel to and spaced from said first axis, f. means connecting said rotary members wherein rotation of said first rotary member causes said second rotary member to revolve about said first axis, g. an arm rotatably mounting said second rotary member on said second axis and fixed means pivotally mounting said arm on a third axis parallel to and spaced from said first and second axes, and h. rotatable drive means to rotate one of said rotary members to cause said second rotary member to rotate about said second axis and revolve about said first axis while moving said output member in a predetermined acceleration and velocity pattern along said path.

21. An apparatus as defined in claim 20 in which said drive means comprises a prime mover assembly having an output rotating drive member coincident with said third axis and torque transfer means between said output rotating drive member and said second rotary member.

22. An apparatus as defined in claim 20 in which said drive means comprises a prime mover assembly affixed to said arm and torque transfer means connecting said prime mover to said second rotary member.

* * * * *